United States Patent [19]

Schad

[11] Patent Number: 4,588,367
[45] Date of Patent: May 13, 1986

[54] HOT RUNNER MANIFOLD FOR INJECTION MOLDING MACHINE

[75] Inventor: Robert D. Schad, Toronto, Canada

[73] Assignee: Husky Injection Molding Systems Ltd., Bolton, Canada

[21] Appl. No.: 630,970

[22] Filed: Jul. 16, 1984

[51] Int. Cl.$^4$ ............................................. B29F 1/03
[52] U.S. Cl. ................................ 425/549; 264/328.15; 425/571; 425/572
[58] Field of Search ............... 425/548, 549, 567, 570, 425/572, 571; 384/278; 264/328.8, 328.14, 328.15

[56] References Cited

U.S. PATENT DOCUMENTS 4,043,740 8/1977 Gellert ................................ 425/566
4,268,240 5/1981 Rees et al. ........................... 425/549
4,333,629 6/1982 Roy ..................................... 249/119
4,394,117 7/1983 Taylor ................................. 425/549

FOREIGN PATENT DOCUMENTS 160541 9/1983 German Democratic Rep. ..................................... 425/572
58-179628 10/1983 Japan ................................... 425/572

Primary Examiner—Jay H. Woo
Assistant Examiner—James C. Housel
Attorney, Agent, or Firm—Bachman & LaPointe

[57] ABSTRACT

A pressure molding machine of the type having a floating manifold including thermal expansion support elements for sealing and centering the nozzles relative to the floating manifold.

11 Claims, 6 Drawing Figures

HOT RUNNER MANIFOLD FOR INJECTION MOLDING MACHINE

BACKGROUND OF THE INVENTION

The present invention relates to pressure molding and relates in particular to distribution manifold systems termed "hot runners" for supplying hot flowable plastic material to a number of mold cavities via nozzles under conditions of controlled pressure and temperature and with substantially uniform flow rates, thereby creating uniform quality molded products in each of the mold cavities.

Unavoidable differences between the temperatures of the individual elements of such systems, start-up temperature transitions, time to stabilize temperatures and the thermal characteristics of the system components create problems of thermal expansion differences which lead to misalignment and plastic material leaks between the components, as well as mechanical damage, which can be minimized only at great expense by finishing and assembling them with extreme accuracy.

Frequently the manifolds are supported movably (termed "floating") to accommodate differential thermal expansion while preserving a seal between the channels within the manifold and channels from the manifold to the mold cavities through nozzles; and also while providing sufficient support of the manifold during operation.

A prior art floating manifold is disclosed and described in U.S. Pat. No. 4,333,629, issued June 8, 1982 to S. S. Roy entitled Floating Manifold for Multi-Cavity Injection Mold.

In the '629 reference the manifold 16 makes a telescopic or sliding fit with a supply tube 30 received in manifold inlet 22 to allow for thermal expansion along the supply tube. Correspondingly the discharge side of the manifold makes a sliding fit with the mold cavities in that delivery tubes 56 float relative to mating cavities.

SUMMARY OF THE INVENTION

It is a particular feature of the present invention to provide a nozzle-manifold assembly where the nozzle is centered relative to the mold cavity as well as relative to the manifold with increasing integrity and pressure tightness, as the temperature of the assembly increases.

A further feature of the invention is the provision of a novel thermal expansion element at a joint between a floating manifold and a mating nozzle.

A further feature of the invention is the provision of a novel method of sealing joints between manifold conduits and mating nozzles; and the avoidance of pressure peaks in the manifold support elements.

A still further feature of the invention is the provision of a nozzle combined with a thermal expansion element as a unitary assembly.

A hot runner embracing certain principles of the present invention may comprise a floating manifold disposed between spaced abutments, said manifold having a plurality of conduits communicating with and contacting mating nozzles set in one of said abutments, means for sealing the manifold relative to the nozzles including a thermal expansion support element formed integrally with each nozzle disposed between the manifold and said one abutment, said element being spaced from said abutment whereby heat generated in said manifold is conducted to the nozzle and to the said support element causing the element to expand into contact with said abutment to wedge and seal the nozzle tightly between said abutments.

A method of sealing joints between nozzles and mating manifold conduits embracing certain other principles of the present invention may comprise the steps of disposing the manifold movably between at least two spaced abutments, setting at least one nozzle loosely in one of said abutments in line with a mating manifold conduit, incorporating a first heat responsive expansion element with said nozzle, positioning the nozzle so that the nozzle inlet contacts said manifold and the expansion element is spaced from one abutment and heating the manifold so that heat is conducted to said nozzle and to said expansion element causing the element to expand to drive the nozzle into sealing contact with said manifold and the manifold, in turn, into tight contact with the other abutment.

BRIEF DESCRIPTION OF THE DRAWINGS

Other features and advantages of the invention will become more apparent from an examination of the succeeding specification when read in conjunction with the appended drawings, in which.

DESCRIPTION OF PREFERRED EMBODIMENT

Figure 2:
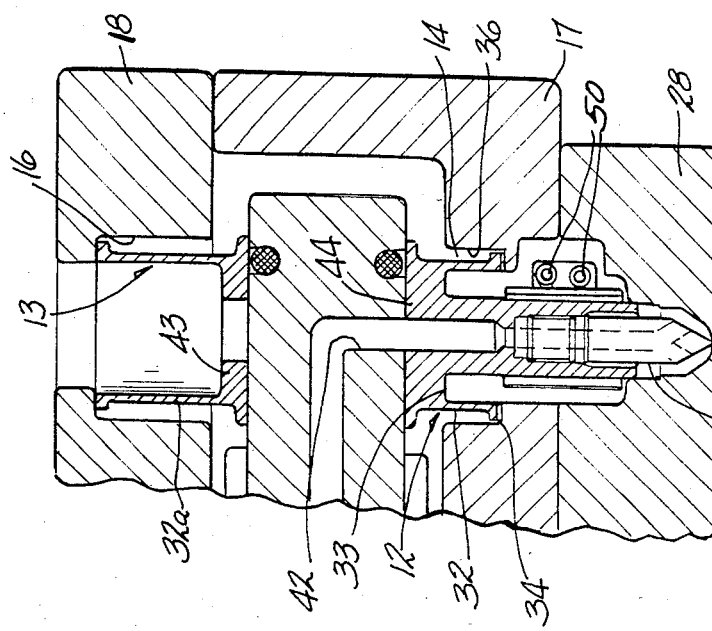
FIG. 2 is a view of a portion of FIG. 1 (lower nozzle assembly) in section for clarity.

Referring to the drawings the reference numeral 11 denotes a floating manifold disposed between thermal expansion support elements 12—12 and 13—13 received in mating wells 14—14 and 16—16 formed in manifold plate 17 and backing plate 18, respectively.

A pressure molding means 19 advances plastic material under high pressure through conduit 21 into main manifold channel 22 and thence to nozzles 23 and 24 which, in turn, direct plastic into mold cavities 26 and 17 formed in platens 28 and 29. Naturally, additional nozzles may be employed; however, for purposes of illustration only two are shown herein.

For purposes of claiming the invention backing plate 18 defines one abutment and fixed platen 28 and manifold plate 17 together define another abutment of a spaced pair of abutments.

Referring to FIG. 2 it is apparent that thermal expansion element 12 comprises a tubular member 32 surrounding and spaced from nozzle 24. One end of the tubular member is connected to the body of the expansion element by a bridge 33 and the other end terminates in a peripheral flange 34 which fits within the side wall 36 of well 14.

Figure 2A:
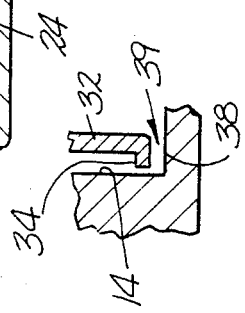
FIG. 2A is an illustration of a portion of FIG. 2, enlarged.
Figure 1:
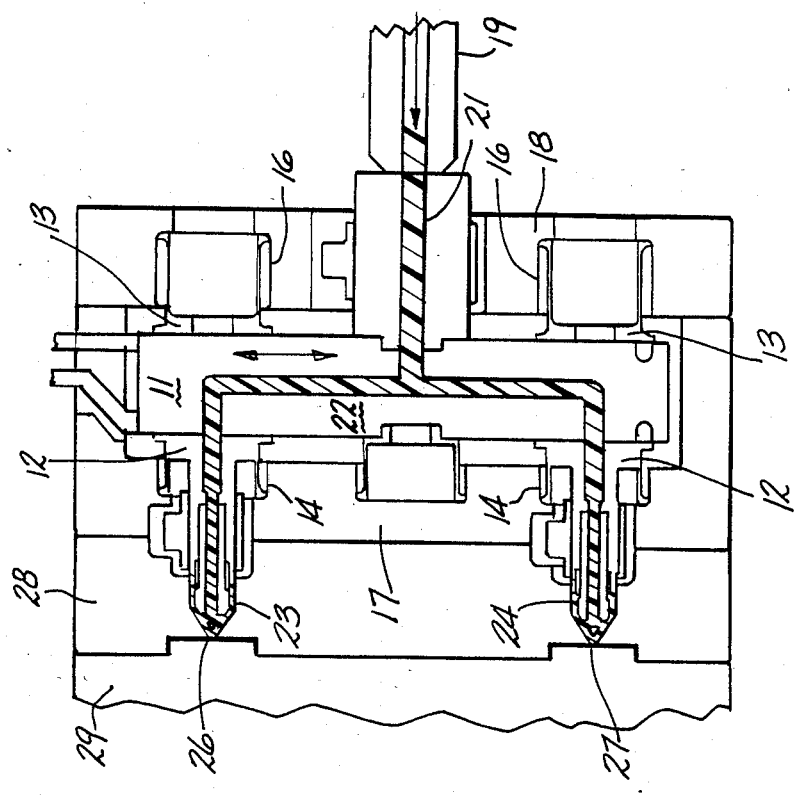
FIG. 1 is a schematic illustration showing a floating manifold, associated nozzles, mold cavities and the flow path of molten plastic.

Note that the flange 34 is spaced from the bottom wall 38 of the well 14 as indicated by the reference numeral 39 in FIG. 2A. The bore of nozzle 24 is coaxial with the bore of well 14 and the peripheral flange 34 serves to center the nozzle relative to mold cavity 27.

On the opposite side of manifold 11 well 16 formed in abutment 18 receives a support element 13.

Element 13, independent of a nozzle, is seated in the bottom of well 16 and its head 43 contacts one side of floating manifold 11 as does head 44 of combined nozzle 24 and thermal expansion support element 12 upon the opposite side of the manifold.

In operation the seal between the nozzle 24 and mating manifold conduit 42 is accomplished in the following manner: As temperature builds up during the course of machine start-up, the manifold conducts heat to nozzle 24 (nozzle 24 may also be heated by independent heaters connected to any desired heating source, not shown). In turn, heat is conducted to the tubular member 32 of expansion element 12 and to the corresponding tubular member 32a of the opposite expansion element 13; all while abutment 18 is maintained at ambient temperature.

The manifold 11 tends to expand with increase in temperature and the tubular members 32-32a of support elements 12 and 13 also expand (element 12 closing gap 39 FIG. 2A) creating high compressive forces reacting on spaced abutments 17-28 and 18 to effect a seal at the interface of each nozzle and its mating manifold orifice.

At the same time the peripheral flange 34 of integral support element 12 within the inner side wall 36 of well 14 maintains coaxial alignment of the bore of nozzle 24 with the gate of the mold cavity 27 and with its mating manifold conduit.

Figure 4:
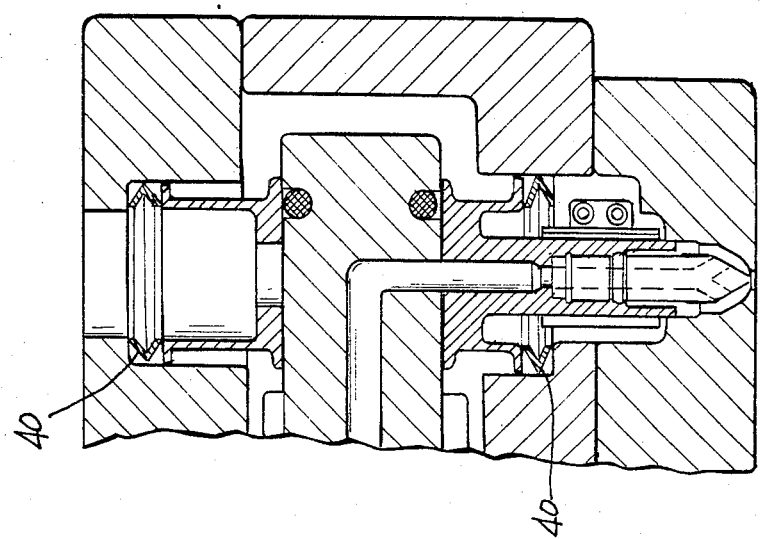
FIG. 4 is a view of a still further embodiment of a nozzle-thermal expansion support assembly.
Figure 5:
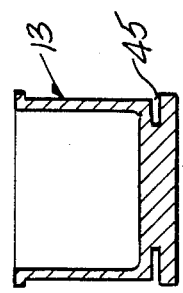
FIG. 5 is an enlarged view of a thermal expansion element support which is independent of a nozzle.
Figure 3:
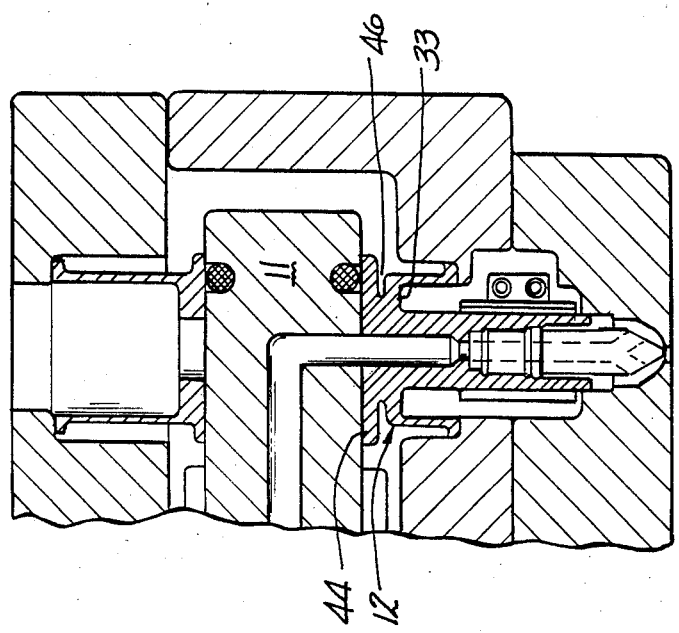
FIG. 3 is a view similar to FIG. 2 showing an alternative nozzle-thermal expansion support element assembly.

FIGS. 3, 4 and 5 show alternative embodiments of the expansion elements in that in FIG. 3 the head 44 of support element 12 is spring-like due to undercut 46 which provides flexibility by reducing the resistance to bending at bridge 33.

A further alternative includes the introduction of spring means at the base of each well as is most apparent in FIG. 4. The spring means, indicated generally by the reference numeral 40, which may take the form of a Belleville disc or other convenient resilient device is disposed between the base of the well and the adjacent peripheral flange.

FIG. 5 shows a still further embodiment in that the thermal expansion support element which is on the side of the manifold opposite the nozzle can be provided with a peripheral undercut 45 to add flexibility to said support element 13—13.

Referring to the operation of the device of the present invention, before the start of operation, all elements are at the same ambient temperature. During operation, they must be heated and then maintained at their respective temperatures through the manifold and the nozzles while the cavity plate 29 is chilled and plate 28 remains substantially at ambient temperature so that the plastic may flow unhindered. The several components of the hot-runner must maintain accurate, tight alignment and sealing engagement with each other while each is at its respective operating temperature and thus subject to different amounts of heat expansion. Considerable difficulty was heretofore encountered in the construction of the several individual elements, including the expansion and support elements coacting with the manifold plate 17 and the abutments so that sealing at operating temperature and maintenance of the position of the nozzle during extended operation may be assured without endangering the integrity of the assembly and of the support elements in particular.

According to the present invention, the nozzle is designed to be self-centering and self-sealing with increasing temperature, as shown in FIG. 2, whereby the low temperature of the plates 17 and 18 and of the gate of the mold cavity 27 do not interfere with proper flow of plastic through the nozzle.

Nozzles 24 are loosely positioned while the components of the hot-runner are altogether at ambient temperature. As the manifold 11 heats up to operating temperature, the nozzle 24 is heated by contact with manifold 11 and also by heaters 50. Due to heat expansion, manifold 11 tends to compress support elements 12 and 13. At the same time, the heat expansion of nozzles 24 forces flange 34 into contact with bottom wall 38 thereby closing gap 39. Hence, full compressive support will be established from plate 17 through manifold 11 and plate 18 by means of the nozzles 24 in combination with supports 12-13.

In order for these elements to function properly, these mutual dimensional relationships are critical, often requiring very accurate and expensive parts' manufacture and assembly. Thus, for example, support elements 12 and 13 must expand no more than necessary for transmission of forces at the operating temperature and not enough to generate stress peaks that may collapse them. To avoid this criticality of dimensions and thereby reduce the cost of the assembly while reducing the chances of damage, support elements 12 and 13 may be provided with spring-like characteristics or cooperate with spring elements according to the present invention.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. In a hot runner for pressure molding having a floating manifold disposed between at least two spaced abutments, said manifold having a plurality of conduits communicating with and contacting mating nozzles set in one of said abutments, means for sealing the manifold relative to said nozzles comprising:

a first thermal expansion support element integral with each nozzle disposed between the manifold and said one abutment, said element being spaced from said abutment and in contacting relationship with said manifold, a second thermal expansion support element between the manifold and the other of said spaced abutments in contacting relationship with said manifold, and spring means disposed between the support elements and mating abutments, whereby heat generated in operation of said manifold is conducted to the nozzle and to the first thermal expansion support element causing the element to expand into contact with said one abutment to clamp and seal the nozzle tightly between said abutments and to establish full compressive support between said nozzle, abutments and manifold.

2. The hot runner of claim 1 wherein a portion of said first thermal expansion support element is spaced from said nozzle and is disposed in a well formed in said one abutment.

3. The hot runner of claim 1 in which each support element is disposed in a well formed in said abutments.

4. The hot runner of claim 2 in which one end of said portion is spaced from an internal surface of said well.

5. The hot runner of claim 4 in which the other end of said portion is connected to said nozzle by a peripheral bridge.

6. The hot runner of claim 4 in which said well includes a side wall and a bottom wall and said one end of said portion is formed with an aligning flange, said flange being spaced from said bottom wall and making a relatively snug fit with said side wall.

7. The hot runner of claim 6 in which the nozzle is formed with a through-bore and said well and said portion are circular in cross-section and coaxial with said bore effective to align said nozzle with its mating abutment.

8. The hot runner of claim 1 in which the thermal expansion support elements on the opposite side of said manifold are in contact with the manifold and with the mating abutment.

9. In a hot runner for pressure molding having a floating manifold disposed between at least two spaced abutments, said manifold having a plurality of conduits communicating with and contacting mating nozzles set in one of said abutments, means for sealing the manifold relative to said nozzles comprising:

a first thermal expansion support element integral with each nozzle disposed between the manifold and said one abutment, said element being spaced from said abutment and in contacting relationship with said manifold, a second thermal expansion support element between the manifold and the other of said spaced abutments in contacting relationship with said manifold, whereby heat generated in operation of said manifold is conducted to the nozzle and to the first thermal expansion support element causing the element to expand into contact with said one abutment to clamp and seal the nozzle tightly between said abutments and to establish full compressive support between said nozzle, abutments and manifold, wherein at least one of said first and second thermal expansion support elements is formed with a peripheral undercut defining a cross-section exhibiting spring-like characteristics.

10. The hot runner of claim 9 wherein a portion of said first thermal expansion support element is spaced from said nozzle and is disposed in a well formed in said one abutment, one end of said portion is spaced from an internal surface of said well and the other end of said portion is connected to said nozzle by a peripheral bridge in which said bridge is formed with a peripheral undercut to render said bridge and said portion spring-like.

11. The hot runner of claim 9 wherein the second thermal expansion support element is in contact with the manifold and with the mating abutment and is formed with a peripheral undercut defining a cross-section exhibiting spring-like characteristics.

* * * * *